United States Patent Office 3,374,150
Patented Mar. 19, 1968

3,374,150
PROCESS FOR PRODUCING L-ORNITHINE
Yuichi Noguchi, Tetsuo Uno, Yoshita Kubota, and Hiroshi Hosoda, Hofu-shi, Japan, assignors to Kyowa Hakko Kogyo Co., Ltd., Tokyo, Japan, a corporation of Japan
No Drawing. Filed Apr. 22, 1965, Ser. No. 450,207
Claims priority, application Japan, Apr. 22, 1964, 39/22,386; June 27, 1964, 39/36,270
17 Claims. (Cl. 195—47)

ABSTRACT OF THE DISCLOSURE

A fermentation process for producing L-ornithine which comprises culturing a microorganism capable of producing L-ornithine, such as *Micrococcus glutamicus* ATCC 13,232, in an aqueous nutrient medium under aerobic conditions in the presence of approximately 0.01 to 1.0% by weight of esters of monohydric alcohols with saturated aliphatic carboxylic acids, derivatives of the esters, especially the alkyl-substituted derivatives in the acid moiety thereof, and mixtures thereof. Exemplary esters include the alkyl esters of citric acid, succinic acid, malic acid, malonic acid, adipic acid and gluconic acid, the alkyl ester moieties thereof each having from 1 to 10 carbon atoms.

This invention relates to the preparation of L-ornithine. More particularly, it relates to a process for the preparation of L-ornithine by fermentation. Even more particularly, the invention relates to a process for the preparation of L-ornithine by fermentation with microorganisms in the presence of certain organic acid esters or the derivatives thereof.

A method for producing ornithine by fermentation has been reported in Japanese Patent No. 277,645 (which corresponds to U.S. Patent 2,988,489) wherein a mutant strain belonging to *Micrococcus glutamicus* which requires citrulline (which may be substituted by arginine) is cultured in a culture medium containing carbohydrates, a nitrogen source, inorganic compounds and the like.

Recently, methods of producing various L-amino acids by fermentation have been greatly developed. Moreover, their application to an industrial scale has been enlarged because of a great increase in the consumption and use of L-amino acids. However, there are yet many unknown factors which influence the production of L-amino acids by fermentation at the present time. Hence, many problems still exist with respect to fermentation conditions therefor. The study and application of these factors thus is of great importance for the production of L-amino acids in high yield on an industrial scale.

One of the objects of the present invention is to provide an improved process for the preparation of L-ornithine which overcomes the disadvantages and deficiencies of the prior art methods.

Another object of the present invention is to provide a process for the preparation of L-ornithine by fermentation which may be carried out in an efficacious and simple manner.

A further object of the invention is to provide a process for the preparation of L-ornithine by fermentation which gives the product in high purity and good yield.

A still further object of the invention is to provide a process for the preparation of L-ornithine by fermentation which may be carried out advantageously on an industrial scale to give a high yield of product.

These and other objects of the present invention will become apparent to those skilled in the art from a reading of the following specification and claims.

In searching for various factors related to fermentation processes involving microorganisms to give L-ornithine, the present inventors found that a remarkable amount of L-ornithine is accumulated in the culture medium if a citric acid ester is added to a culture medium containing the essential nutrients for the growth of the microorganism such as a carbon source, a nitrogen source, inorganic compounds and the like. Furthermore, as a result of many studies on various other organic acid esters, it has been recognized that all sorts of organic acid esters such as the fumaric acid esters have an inhibiting effect on the preparation of L-ornithine by fermentation.

In accordance with the present invention, it has been found that an efficacious fermentation method for producing L-ornithine is effected by conducting the culture in a culture medium containing, besides the conventional ingredients, organic acid esters, of monohydric alcohols with saturated aliphatic carboxylic acids, esters of monohydric alcohols with derivatives of saturated aliphatic carboxylic acids, or mixtures thereof.

As organic acid esters of monohydric alcohols with saturated aliphatic carboxylic acids effective in the process of the present invention, there may be mentioned, by way of example, mono-, di- and tri-esters of monohydric alcohols with citric acid, such as propyl citrate, isopropyl citrate, butyl citrate, isobutyl citrate, amyl citrate, isoamyl citrate, hexyl citrate, heptyl citrate, octyl citrate, nonyl citrate, decyl citrate, etc., mono- and di-esters of monohydric alcohols with succinic acid, such as propyl succinate, isopropyl succinate, butyl succinate, isobutyl succinate, amyl succinate, isoamyl succinate, hexyl succinate, heptyl succinate, octyl succinate, nonyl succinate, decyl succinate, etc., esters of monohydric alcohols with malic acid, malonic acid, adipic acid, etc., monoesters of monohydric alcohols with gluconic acid and the like, and mixtures of two or more of these. Furthermore, esters of monohydric alcohols with derivatives of saturated aliphatic carboxylic acids, especially esters of monohydric alcohols with alkyl-substituted saturated aliphatic carboxylic acids, such as esters of monohydric alcohols with acetylmalic acid and the like, are effective in the process of the present invention.

In order to demonstrate the effectiveness of adding various kinds of organic acid esters of monohydric alcohols with saturated aliphatic carboxylic acids in varying amounts to a culture medium in accordance with the present invention, the following experiments showing the production of L-ornithine by fermentation with the use of *Micrococcus glutamicus* are given as illustrative. Unless otherwise noted, the percentages given are by weight.

EXPERIMENT 1

This experiment demonstrates the relationship between the type of alkyl radical which may be substituted on an ester of a monohydric alcohol with succinic acid in accordance with the process of the present invention, the amounts thereof to be added to a culture medium, and the effects thereof.

The fermentor used in all the fermentation tests is a 5-liter jar.

300 ml. of seed liquor of an L-ornithine-producing bacterium of the type *Micrococcus glutamicus* ATCC No. 13,232 is inoculated into 3 liters of a culture medium containing 27% of black strap molasses, 1.5% of an aqueous amino acid solution (arginine source), and 3% of ammonium sulfate. The thusly inoculated medium is incubated while being rotated at the speed of 700 r.p.m., at 30° C., under an aeration rate of 3 liters/min. of air for 72 hours.

During incubation, the pH is adjusted to 7.0 with a 17% aqueous ammonia solution. The experimental results are as follows:

|  | Amount of Ester Added (percent) | Amount of L-Ornithine Produced (mg./ml.) |
| --- | --- | --- |
| (1) Di-isoamyl succinate | 0.10 | 54.0 |
| Do | 0.15 | 55.5 |
| Do | 0.20 | 58.0 |
| No addition |  | 42.5 |
| (2) Di-n-hexyl succinate | 0.10 | 60.5 |
| Do | 0.15 | 57.0 |
| Do | 0.20 | 15.5 |
| No addition |  | 43.0 |
| (3) Di-n-octyl succinate | 0.10 | 59.0 |
| Do | 0.15 | 42.0 |
| Do | 0.15 | 42.0 |
| Do | 0.20 | 20.0 |
| No addition |  | 42.3 |

EXPERIMENT 2

This experiment indicates the effect of the type of organic acid contained in the organic acid esters of monohydric alcohols with saturated aliphatic carboxylic acids added to culture media in accordance with the present invention.

The fermentation tests are conducted the same as in Experiment 1. The effect of adding organic acid esters, for example, n-propyl-fumarate, to an L-ornithine-producing culture medium, is shown herein as a comparative reference.

The experimental results are as follows:

|  | Amount of Ester Added (percent) | Amount of L-Ornithine Produced (mg./ml.) |
| --- | --- | --- |
| Di-n-propyl succinate | 0.1 | 57.5 |
|  | 0.2 | 60.0 |
| Di-n-propyl malate | 0.1 | 53.0 |
|  | 0.2 | 52.5 |
| Di-n-propyl malonate | 0.1 | 53.0 |
|  | 0.2 | 56.2 |
| Di-n-propyl adipate | 0.1 | 48.0 |
|  | 0.2 | 58.0 |
| n-Propyl gluconate | 0.1 | 48.6 |
|  | 0.2 | 52.0 |
| (n-Propyl fumarate) | 0.1 | 35.2 |
|  | 0.2 | 22.6 |
| No addition |  | 45.0 |

EXPERIMENT 3

The fermentation tests are conducted in a 5-liter jar fermentor.

300 ml. of seed liquor of an L-ornithine-producing bacterium of the type *Micrococcus glutamicus* ATCC No. 13,232 is inoculated into 3 liters of a culture medium containing 28% of black strap molasses and 1.5% of an aqueous amino acid solution (arginine source). The medium is incubated for 72 hours under the following conditions:

Revolution speed, 700 r.p.m.
Temperature, 30° C.
Aeration rate, 3 liters/min.

During the incubation, the pH is adjusted to 7.0 with a 17% aqueous ammonia solution.

The experimental results are as follows:

|  | Amount of Ester Added (percent) | Amount of L-Ornithine Produced (mg./ml.) |
| --- | --- | --- |
| 1) Tributyl citrate | 0.03 | 64.0 |
| Do | 0.10 | 66.0 |
| Do | 0.15 | 66.0 |
| Do | 0.20 | 65.0 |
| No addition |  | 45.0 |
| (2) Dibutyl citrate | 0.03 | 54.5 |
| Do | 0.10 | 57.5 |
| Do | 0.15 | 60.0 |
| Do | 0.20 | 60.0 |
| No addition |  | 52.5 |
| (3) Monobutyl citrate | 0.03 | 42.0 |
| Do | 0.10 | 45.0 |
| Do | 0.15 | 50.5 |
| Do | 0.20 | 51.0 |
| No addition |  | 41.0 |
| (4) Tri-isoamyl citrate | 0.03 | 52.6 |
| Do | 0.10 | 55.0 |
| Do | 0.15 | 57.0 |
| Do | 0.20 | 50.7 |
| No addition |  | 40.6 |
| (5) Hexyl citrate | 0.03 | 53.0 |
| Do | 0.10 | 63.0 |
| Do | 0.15 | 75.0 |
| Do | 0.20 | 4.0 |
| No addition |  | 45.0 |
| (6) Tri-n-octyl citrate | 0.03 | 52.0 |
| Do | 0.10 | 57.0 |
| Do | 0.15 | 40.0 |
| Do | 0.20 | 5.0 |
| No addition |  | 40.0 |

As shown by Experiments 1, 2 and 3, the amount of L-ornithine produced varies with the type and amount of organic acid ester added to the fermentation medium. However, it is evident that the amount of L-ornithine produced is remarkably increased in all cases where the fermentation is conducted in the presence of an ester of a monohydric alcohol with a saturated carboxylic acid in accordance with the present invention, as compared to the absence thereof.

Suitable amounts of said esters to be added to the fermentation medium vary approximately from 0.01 to 1.0% by weight, although this varies somewhat with the concentration of sugar employed and especially with the kind of organic acid ester additive utilized. It is needless to say and should be obvious to one skilled in the art that the addition of optimum amounts of said esters is necessary for a most effective fermentation production of L-ornithine once the various culture conditions to be employed have been decided upon.

As for the composition of the culture medium, either a synthesized culture medium or an organic culture medium is suitable as long as it contains the essential nutrients for the growth of the microorganisms employed. Such nutrients are well known in the art and include substances such as a carbon source, a nitrogen source, inorganic compounds and the like which are utilized by the bacterium employed in appropriate amounts. Thus, as a carbon source, there may be mentioned, by way of example, glucose, sucrose, mannose, galactose, fructose, maltose, lactose, trehalose, cellobiose, raffinose, arabitol, sorbitol, inositol, xylose, arabinose, starch hydrolysate solution, beet molasses, black strap molasses, and the like. These substances may be used either singly or in mixtures of two or more. As a nitrogen source, various kinds of inorganic or organic salts such as ammonia, ammonium sulfate, ammonium chloride, ammonium nitrate, ammonium carbonate, ammonium acetate, etc., nitrates, urea, or other compounds containing nitrogen, such as peptone, N-Z-Amine (trademark for a series of casein hydrolysates), meat extract, yeast extract, cornsteep liquor, distillers dried solubles, casein hydrolysate, fish meal, soybean oil meal, pupa, fermentation dregs and the like may be employed. Again, these substances are utilizable either singly or in combinations of two or more. Furthermore, it is necessary to add to the culture medium amino acids which are essential nutrients for the growth of the bacteria. Finally, inorganic compounds which may be added to the culture medium include potassium dihydrogen phosphate, potassium monohydrogen phosphate, magnesium sulfate, calcium carbonate, manganese sulfate, etc.

The following examples are given merely as illustrative of the present invention and are not to be considered as limiting. Unless otherwise noted, the percentages therein are by weight.

It should be noted that the beneficial effects of the present invention illustrated by the examples may also be attained with the use of mixtures of two or more of the said esters.

Example 1

2 liters of seed liquor of L-ornithine-producing bacterium of the type *Micrococcus glutamicus* ATCC No. 13,232 is inoculated into 20 liters of a culture medium containing 27% of black strap molasses made in the Philippines, 2.0% of an aqueous amino acid solution (arginine source) and 2.0% of ammonium sulfate. 30 ml. of di-isopropyl succinate is added to the medium, and it is incubated for 72 hours under the following conditions: speed of rotation, 400 r.p.m.; temperature, 30° C.; aeration rate, 10 liters/min. The pH of the medium is adjusted to 7.0 with a 17% aqueous ammonia solution during the cultivation.

At the beginning of the fermentation, the sugar concentration is about 15.2%. After fermentation, there is obtained about 20.5 liters of fermentation liquor containing 2.1% of residual sugar. The amount of L-ornithine produced is 61.0 mg./ml. A 41.0% yield of ornithine based on sugar is obtained. (On the other hand, only 45.0 mg./ml. of L-ornithine is produced and a 29.6% yield of ornithine based on sugar is obtained if di-isopropyl succinate is not added to the medium employed in this example.)

By passing the fermentation liquor through an ion exchange resin column, the L-ornithine is adsorbed. It is then dissolved off the column, and after concentrating the rich cut thereof under reduced pressure, 910 grams of crude crystals of L-ornithine is obtained by crystallization with hydrochloric acid.

Example 2

20 ml. of di-n-octyl succinate is added to a culture medium containing 27% of black strap mollasses made in the Philippines, 1.5% of an aqueous amino acid solution (arginine source) and 3.0% of ammonium chloride. 300 ml. of seed liquor of L-ornithine-producing bacterium *Micrococcus glutamicus* ATCC No. 13,232 is inoculated thereinto. The medium is cultured for 72 hours under the following conditions: speed of rotation, 700 r.p.m.; temperature, 30° C.; aeration rate, 3 liters/min. The pH of the medium is adjusted to 7.0 with a 17% aqueous ammonia solution during the fermentation.

The results obtained are as follows: sugar concentration at the beginning, 15.0%; volume of liquor at the completion of fermentation, 19.0 liters; residual sugar, 2.2%; amount of L-ornithine produced, 58.0 mg./ml.; yield of ornithine based on sugar, 36.7%. (On the other hand, only 43.0 mg./ml. of L-ornithine is produced, and a 27.2% yield of ornithine based on sugar is obtained if the same example is carried out in the absence of di-n-octyl succinate.)

Example 3

Similarly, to Example 1, a cultivation is carried out in the same basal culture medium as that of Example 1. However, 20 ml. of di-n-butyl malate is added to the medium instead of isopropyl succinate.

The results obtained are the following: sugar concentration at the beginning, 14.7%; volume of liquor at the completion of fermentation, 200 liters; residual sugar, 2.0%; L-ornithine produced, 55.5 mg./ml.; yield of ornithine based on sugar, 37.5%. (On the other hand, only 50.5 mg./ml. of L-ornithine is produced and a yield of ornithine based on sugar of 34.4% is obtained if di-n-butyl malate is not added to the medium of this example.)

The fermentation liquor is treated as described in Example 1. 750 grams of crude crystals of L-ornithine is obtained thereby.

Example 4

30 ml. of di-n-butyl malonate is added to the same culture medium as that of Example 1. The fermentation is carried out in the same manner as that of Example 1.

The results thereof are as follows: sugar concentration at the beginning of the fermentation, 15.7%; volume of liquor at the completion of the fermentation, 19.0 liters; L-ornithine produced, 62.5 mg./ml.; yield of ornithine based on sugar, 37.9%. (On the other hand, only 51.5 mg./ml. of L-ornithine and a 31.5% yield of ornithine based on sugar are obtained when di-n-butyl malonate is not added to the medium and the fermentation conducted in the same way as described herein.)

The fermentation liquor is treated in accordance with the procedure described in Example 1. 830 grams of crude crystals of L-ornithine is recovered.

Example 5

40 ml. of n-butyl gluconate is added to the same basal culture medium as that of Example 2. The same cultivation as that described in Example 2 is carried out.

The results are as follows: sugar concentration at the beginning of fermentation, 16.0%; volume of liquor at the completion of fermentation, 19.5 liters; amount of L-ornithine produced, 59.3 mg./ml.; yield of ornithine based on sugar, 36.2%. (On the other hand, only 49.5 mg./ml. of L-ornithine and a 31.0% yield of ornithine based on sugar are obtained if n-butyl gluconate is not added to the fermentation medium.)

800 grams of crude crystals of L-ornithine is obtained by treating the fermentation liquor in accordance with Example 1.

Example 6

40 ml. of isopropyl adipate is added to the same basal culture medium as that of Example 2. The same fermentation procedure as that described in Example 2 is conducted.

The results are as follows: sugar concentration at the beginning of fermentation, 14.5%; volume of liquor at the completion of fermentation, 19.7 liters; amount of L-ornithine produced, 58.7 mg./ml.; yield of ornithine based on sugar, 39.8%. (On the other hand, only 46.0 mg./ml. of L-ornithine and a 30.2% yield of ornithine based on sugar are obtained if the isopropyl adipate is not added to the fermentation medium.)

810 grams of crude crystals of L-ornithine is obtained by treating the fermentation liquor in accordance with Example 1.

Example 7

30 ml. of tri-n-hexyl citrate is added to 20 liters of a culture medium containing 28% of black strap molasses made in the Philippines, 2.0% of an aqueous amino acid solution (arginine source) and 2.0% of ammonium sulfate. Inoculated thereinto is 2 liters of seed liquor of L-ornithine-producing bacterium of the type *Micrococcus glutamicus* (ATCC No. 13,232). The thusly inoculated medium is incubated for 72 hours under the following conditions: speed of rotation, 400 r.p.m.; temperature, 30° C.; aeration rate, 10 liters/min. During the fermentation of the culture, the pH thereof is adjusted to 7.0 with a 17% aqueous ammonia solution.

The results of this fermentation are as follows: sugar concentration at the beginning of fermentation, 16.7%; volume of liquor at the completion of fermentation, 19.7 liters; residual sugar, 2.0%; amount of L-ornithine produced, 77.0 mg./ml.; yield of ornithine based on sugar, 45.5%. (Only 54.7 mg./ml. of L-ornithine is produced and a 32.0% yield of ornithine based on sugar is obtained if tri-n-hexyl citrate is not added to the fermentation medium.)

The L-ornithine is adsorbed by passing the fermentation liquor through an ion exchange resin column. Subsequently, it is dissolved off the column, and after concentrating the rich cut under reduced pressure, 840 grams of crude crystals of L-ornithine is recovered by crystallization with hydrochloric acid.

*Example 8*

The cultivation is conducted by using the same basal culture medium as that of Example 7 but wherein 30 ml. of tri-isoamyl citrate is added to the medium instead of n-hexyl citrate. The results are as follows: sugar concentration at the beginning of fermentation, 15.7%; volume of liquor at the completion of fermentation, 19.2 liters; residual sugar, 2.0%; L-ornithine produced, 69.5 mg./ml.; yield of ornithine based on sugar, 42.5%. (Only 48.6 mg./ml. of L-ornithine and a 34.0% yield of ornithine based on sugar are obtained if tri-isoamyl citrate is not added to the fermentation medium herein.)

82.5 grams of crude crystals of L-ornithine is obtained by treating the fermentation liquor in accordance with the procedure described in Example 7.

*Example 9*

20 ml. of tri-n-octyl citrate is added to 3 liters of a culture medium containing 28% of black strap molasses made in the Philippines, 1.5% of an aqueous amino acid solution (arginine source) and 3.0% of ammonium chloride. 300 ml. of seed liquor of the L-ornithine-producing bacterium *Micrococcus glutamicus* ATCC No. 13,232 is inoculated thereinto. The medium is then cultured for 72 hours under the following conditions: speed of rotation, 700 r.p.m.; temperature, 30° C.; aeration rate, 3 liters/min. The pH of the medium is adjusted to 7.0 with a 17% aqueous ammonia solution during the fermentation.

The results are as follows: sugar concentration at the beginning of fermentation, 16.0%; volume of liquor at the completion of fermentation, 19.5 liters; residual sugar, 2.0%; amount of L-ornithine produced, 68.9 mg./ml.; yield of ornithine based on sugar, 43.0%. (Only 56.2 mg./ml. of L-ornithine and a 35.1% yield of ornithine based on sugar are obtained if tri-n-octyl citrate is not added to the fermentation medium.)

The fermentation liquor is treated according to Example 7. 800 grams of crude crystals of L-ornithine is thereby recovered.

*Example 10*

The fermentation is conducted in the same culture medium and in the same manner as that described in Example 7 but wherein 60 ml. of tri-n-butyl acetylcitrate is added thereto instead of tri-n-hexyl citrate. The following results are obtained: sugar concentration at the beginning of fermentation, 14.7%; volume of liquor at the completion of fermentation, 19.0 liters; residual sugar, 1.7%; L-ornithine produced, 66.5 mg./ml.; yield of ornithine based on sugar, 43.0%. (Only 55.2 mg./ml. of L-ornithine is produced and a 35.7% yield of ornithine based on sugar is obtained if tri-n-butyl acetylcitrate is not added to the medium.

765 grams of crude crystals of L-ornithine is recovered by treating the fermentation liquor in accordance with Example 7.

*Example 11*

The fermentation is conducted in the same culture medium and in the same manner as in Example 7 except that 60 ml. of di-n-propyl citrate is added thereto. The results are as follows: sugar concentration at the beginning of fermentation, 15.4%; volume of liquor at the completion of fermentation, 19.3 liters; residual sugar, 1.8%; L-ornithine produced, 67.0 mg./ml.; yield of ornithine based on sugar, 42.0%. (Only 52.5 mg./ml. of L-ornithine and a 32.9% yield of ornithine based on sugar are obtained if di-n-propyl citrate is not added thereto.)

*Example 12*

The fermentation is conducted in the same culture medium and under the same conditions as described in Example 7 except that 30 ml. of mono-n-octyl citrate is added thereto. The results are as follows: sugar concentration at the beginning of fermentation, 15.7%; volume of liquor at the completion of fermentation, 19.0 liters; residual sugar, 1.9%; amount of L-ornithine produced, 69.5 mg./ml.; yield of orinthine based on sugar, 42.4%. (Only 50.5 mg./ml. of L-ornithine is produced and a 30.7% yield of ornithine based on sugar is obtained if mono-n-octyl citrate is not added to the medium.)

A process according to this invention may be effected, wherein the culturing is carried out at between 24°–37° C., preferably from 28° to 33° C., while maintaining the pH value of the culturing medium within the range of 5 to 9.

The invention being thus described, it will be obvious that the same may be varied in many ways. Such variations are not to be regarded as a departure from the spirit and scope of the invention and all such modifications are intended to be included within the scope of the following claims.

What is claimed is:

1. In a fermentation process for the production of L-ornithine by the cultivation of *Micrococcus glutamicus*, the improvement which comprises conducting the fermentation in the presence of from approximately 0.01 to 1.0% by weight of a substance selected from the group consisting of esters of monohydric alcohols with saturated aliphatic carboxylic acids, esters of monohydric alcohols with derivatives of saturated aliphatic carboxylic acids and mixtures thereof.

2. A process for producing L-ornithine which comprises culturing *Micrococcus glutamicus* in an aqueous nutrient medium under aerobic conditions in the presence of from approximately 0.01 to 1.0% by weight of a substance selected from the group consisting of esters of monohydric alcohols with saturated aliphatic carboxylic acids, esters of monohydric alcohols with derivatives of saturated aliphatic carboxylic acids and mixtures thereof.

3. The process of claim 2, wherein said aqueous nutrient medium contains a source of carbon and nitrogen.

4. A process for producing L-ornithine which comprises culturing the microorganism *Micrococcus glutamicus* in an aqueous nutrient medium under aerobic conditions in the presence of from approximately 0.01 to 0.3% by weight of a substance selected from the group consisting of esters of monohydric alcohols with saturated aliphatic carboxylic acids, esters of monohydric alcohols with derivatives of saturated aliphatic carboxylic acids and mixtures thereof.

5. A process for producing L-ornithine which comprises culturing the microorganism *Micrococcus glutamicus* in an aqueous nutrient medium containing a source of carbon and nitrogen under aerobic conditions in the presence of approximately 0.01 to 0.3% by weight of a substance selected from the group consisting of esters of monohydric alcohols with saturated aliphatic carboxylic acids, esters of monohydric alcohols with derivatives of saturated aliphatic carboxylic acids and mixtures thereof.

6. The process of claim 4, wherein said microorganism is *Micrococcus glutamicus* ATCC No. 13,232.

7. The process of claim 5, wherein said microorganism is *Micrococcus glutamicus* ATCC No. 13,232.

8. The process of claim 1, wherein said derivatives of saturated aliphatic carboxylic acids are alkyl-substituted saturated aliphatic carboxylic acids.

9. The process of claim 2, wherein said derivatives of saturated aliphatic carboxylic acids are alkyl-substituted saturated aliphatic carboxylic acids.

10. The process of claim 4, wherein said derivatives of saturated aliphatic carboxylic acids are alkyl-substituted saturated aliphatic carboxylic acids.

11. The process of claim 5, wherein said derivatives of saturated aliphatic carboxylic acids are alkyl-substituted saturated aliphatic carboxylic acids.

12. The process of claim 2, wherein from approximately 0.01 to 0.2% by weight of an alkyl ester of a carboxylic acid selected from the group consisting of citric acid, succinic acid, malic acid, malonic acid, adipic acid, gluconic acid and alkyl-substituted derivatives thereof, the alkyl ester moities thereof each having from 1 to 10 carbon atoms, is employed.

13. The process of claim 12, wherein said microorganism is *Micrococcus glutamicus*.

14. The process of claim 13, wherein said microorganism is *Micrococcus glutamicus* ATCC No. 13,232.

15. The process of claim 12, wherein culturing is carried out at a temperature of from 24° to 37° C. and at a pH of from 5 to 9.

16. The process of claim 15, wherein said microorganism is *Micrococcus glutamicus* ATCC No. 13,232.

17. The process of claim 2, wherein culturing is carried out at a temperature of from 24° to 37° C. and at a pH of from 5 to 9.

References Cited

UNITED STATES PATENTS 2,988,489  6/1961  Kinoshita et al. _____ 195—47

LIONEL M. SHAPIRO, *Primary Examiner.*